United States Patent
Sautreuil et al.

(10) Patent No.: US 9,873,518 B2
(45) Date of Patent: Jan. 23, 2018

(54) ELECTRICAL ARCHITECTURE FOR AN AIRCRAFT, AN AIRCRAFT, AND A METHOD OF USING IT

(71) Applicant: AIRBUS HELICOPTERS, Marignane (FR)

(72) Inventors: Matthieu Sautreuil, Salon de Provence (FR); Gilles Bezes, Lancon de Provence (FR)

(73) Assignee: AIRBUS HELICOPTERS, Marignane (FR)

(*) Notice: Subject to any disclaimer, the term of this patent is extended or adjusted under 35 U.S.C. 154(b) by 418 days.

(21) Appl. No.: 14/799,845

(22) Filed: Jul. 15, 2015

(65) Prior Publication Data

US 2016/0016670 A1 Jan. 21, 2016

(30) Foreign Application Priority Data

Jul. 17, 2014 (FR) ...................... 14 01593

(51) Int. Cl.
*B64D 35/02* (2006.01)
*B64D 27/24* (2006.01)
(Continued)

(52) U.S. Cl.
CPC ............. *B64D 35/02* (2013.01); *B64D 27/10* (2013.01); *B64D 27/24* (2013.01); *B64D 31/14* (2013.01);
(Continued)

(58) Field of Classification Search
CPC ........ B64D 35/02; B64D 35/08; B64D 27/24; B64D 27/10; B64D 31/14; B64D 2221/00;
(Continued)

(56) References Cited

U.S. PATENT DOCUMENTS 6,351,090 B1  2/2002  Boyer et al.
6,954,366 B2  10/2005  Lai et al.
(Continued)

FOREIGN PATENT DOCUMENTS

CN  102201744  9/2011
EP  0911515  4/1999
(Continued)

OTHER PUBLICATIONS

Korean Notice of Preliminary Rejection dated Sep. 29, 2016, Application No. 10-2015-0101380, Applicant AIRBUS Helicopters, 3 Pages.
(Continued)

*Primary Examiner* — Jared Fureman
*Assistant Examiner* — Michael Warmflash
(74) *Attorney, Agent, or Firm* — Brooks Kushman P.C.

(57) ABSTRACT

An electrical architecture for an aircraft having a main electrical machine connected to a fuel burning engine and a secondary electrical machine connected to a power transmission assembly. A high-voltage electrical master box is connected by a first line and by a second line to a multifunction converter, the high-voltage electrical master box connecting the first line to the secondary electrical machine, and the second line to at least the main electrical machine and the secondary electrical machine. The multifunction converter includes a supervisor connected to an avionics system and to a control system controlling the engine, and to a controller of the high-voltage electrical master box.

21 Claims, 2 Drawing Sheets

(51) Int. Cl.
  *B64D 27/10* (2006.01)
  *B64D 31/14* (2006.01)
  *B64D 35/08* (2006.01)
  *B64D 27/02* (2006.01)

(52) U.S. Cl.
  CPC ........ *B64D 35/08* (2013.01); *B64D 2027/026* (2013.01); *B64D 2221/00* (2013.01); *Y02T 50/64* (2013.01); *Y10S 903/904* (2013.01)

(58) Field of Classification Search
  CPC  B64D 2027/026; Y02T 50/64; Y10S 903/904
  See application file for complete search history.

(56) References Cited

U.S. PATENT DOCUMENTS

| | | | |
|---|---|---|---|
| 7,050,312 | B2 | 5/2006 | Tracy et al. |
| 7,923,865 | B2 | 4/2011 | Melse |
| 8,464,980 | B2 | 6/2013 | Certain |
| 8,757,542 | B2 | 6/2014 | Hopdjanian et al. |
| 9,045,223 | B2 | 6/2015 | Connaulte et al. |
| 9,162,771 | B2 * | 10/2015 | Roggemans ........... B64D 31/14 |
| 2008/0123375 | A1 | 5/2008 | Beardsley |
| 2010/0165673 | A1 | 7/2010 | Chang et al. |
| 2013/0039104 | A1 | 2/2013 | Sharma |
| 2014/0013751 | A1 | 1/2014 | Roggemans et al. |

FOREIGN PATENT DOCUMENTS

| | | |
|---|---|---|
| EP | 2327625 | 6/2011 |
| EP | 2404775 | 1/2012 |
| EP | 2684798 | 1/2014 |
| EP | 2703292 | 3/2014 |
| FR | 2961767 | 12/2011 |
| FR | 2993243 | 1/2014 |
| IN | 03358MU2010 | 6/2013 |
| JP | 2011004507 | 1/2011 |
| WO | 2008094148 | 8/2008 |
| WO | 2012137210 | 10/2012 |
| WO | 2014022316 | 2/2014 |

OTHER PUBLICATIONS

French Search Report for French Application No. 1401593, Completed by the French Patent Office on Mar. 20, 2015, 7 Pages.

* cited by examiner

ELECTRICAL ARCHITECTURE FOR AN AIRCRAFT, AN AIRCRAFT, AND A METHOD OF USING IT

CROSS REFERENCE TO RELATED APPLICATION

This application claims priority to French patent application No. FR 14 01593 filed on Jul. 17, 2014, the disclosure of which is incorporated in its entirety by reference herein.

BACKGROUND OF THE INVENTION (1) Field of the Invention

The present invention relates to an electrical architecture for an aircraft, to an aircraft, and to a method performed by the electrical architecture.

The present invention thus relates to the field of aircraft, and in particular aircraft having a rotary wing. More particularly, the invention relates to aircraft having a so-called "hybrid" power plant for driving rotation of at least one rotor of a rotary wing via a main power transmission gearbox of the aircraft. Such a main power transmission gearbox is referred to more simply below as the "power transmission gearbox".

(2) Description of Related Art

A "hybrid" power plant designates a power plant comprising at least one fuel burning engine and at least one electrical member for driving movement of a power transmission gearbox or for transmitting power to the engine during transient engine power stages.

The electrical member may be an electric motor, i.e. an electrical device that performs a motor function only.

Nevertheless, the electrical member may also be an electrical machine, i.e. an electrical device that performs both a motor function and an electricity generator function. An electrical machine can thus operate either in an electric motor mode in order to drive rotation of mechanical members, or else in an electricity generator mode in order to generate electricity. An electrical machine is sometimes said to be "reversible" insofar as the electrical machine can switch from electric motor mode to electricity generator mode, and back again.

An electricity generator is an electrical device that performs solely a function of generating electricity.

The term "electrical member" is used herein to cover an electric motor, an electrical machine, and an electricity generator.

In addition, a rotary wing aircraft may have one or more rotors for providing lift and possibly also propulsion, referred to as "main" rotors. Such a rotary wing aircraft may have one or more auxiliary rotors for controlling movement in yaw of the aircraft, for example.

The power plant conventionally then includes at least one fuel burning engine for driving rotation of the main rotors via the power transmission gearbox.

Such an engine may co-operate with an electrical machine. The electrical machine then operates in electric motor mode on starting the aircraft in order to start the engine.

For example, the engine may be a turboshaft engine having a gas generator. The first electrical machine then serves to rotate the gas generator on starting.

Once the engine has started, the first electrical machine can then be operated in electricity generator mode in order to supply electricity to the on-board network of the aircraft.

The electrical machine then transforms electrical energy into mechanical energy in order to start the engine in a first function, and it transforms mechanical energy coming from the engine into electricity for the on-board network in a second function.

Document FR 2 993 243 describes a hybrid architecture for supplying mechanical power to a rotor that is managed from the on-board network of a rotorcraft.

According to that Document FR 2 993 243, the electrical machine connected to an engine can assist the engine in flight. Such assistance is provided by delivering mechanical energy to the engine from the electrical machine.

Furthermore, rotorcraft are incorporating more and more electrical functions to replace hydraulic systems, and for example to perform new functions. A manufacturer tends to make use of electrical members, given the flexibility made available by electricity in terms of conversion or transformation. Furthermore, electricity is available on board the aircraft via generators or batteries while the aircraft is in flight, or via batteries and electrical connectors for use on the ground.

Nevertheless, the various electrical members of an aircraft have different requirements, and they are connected in different manners.

Some electrical members operate on low-voltage direct current (DC) electricity, or else on high-voltage direct current electricity, or indeed on high-voltage alternating current (AC) electricity. For example, direct current may be distributed at a low voltage of about 28 volts (V) direct current. Direct current can also be distributed at a high voltage of about 270 Vdc, and alternating current may be distributed in a three-phase voltage system with a phase voltage of 115 Vac and a frequency of 400 hertz (Hz).

A voltage higher than 60 V may be referred to as "high" voltage in contrast to a voltage lower than 60 V, which is referred to as "low" voltage.

Certain electrical members produce electricity, whereas other electrical members consume electricity.

Under such circumstances, a manufacturer tends to provide an electricity converter upstream for each electrical member in order to adapt the characteristics of the electricity network to the operation of the member.

Except during stages in which the electrical member is operating, such converters represent on-board deadweight that has a negative influence on the weight breakdown of the aircraft.

The technological background includes in particular the following documents: CN 102 201 744; EP 2 122 271; EP 0 911 515; IN 2010/MU03358; JP 2011/004507; U.S. Pat. No. 6,954,366; U.S. Pat. No. 7,050,312; U.S. 2008/0123375; U.S. 2010/0165673; U.S. 2013/0039104; WO 2012/137210; U.S. Pat. No. 7,923,865; EP 2 404 775; FR 2 961 767; EP 2 703 292; EP 2 327 625; and WO 2014/022316.

BRIEF SUMMARY OF THE INVENTION

An object of the present invention is to provide an architecture that tends to minimize that problem.

The invention provides an electrical architecture for an aircraft including a power transmission assembly connected to at least one lift rotor and driven by at least one fuel-burning engine, the electrical architecture comprising a high-voltage electricity network including a main electrical machine for connecting to the fuel burning engine and a secondary electrical machine for connecting to the power transmission assembly.

The high-voltage electricity network comprises at least one high-voltage electrical master box connected to at least one source of electricity. The high-voltage electrical master box is connected by a first line and by a second line to a multifunction converter, the high-voltage electrical master box having a first connection connecting the first line to said secondary electrical machine, the high-voltage electrical master box having a second connection connecting said second line to at least said main electrical machine and to at least said secondary electrical machine.

For example, the high-voltage electricity network comprises at least one high-voltage electrical master box for each fuel burning engine.

The multifunction converter includes a high-voltage direct current bus connected to a bidirectional inverter. The bidirectional inverter is connected to a second line.

Furthermore, the high-voltage direct current bus communicates electrically with the first line.

The multifunction converter further has a supervisor connected to an avionics system and to a control system controlling the fuel burning engine and to a controller of the high-voltage electrical master box in order to feed electricity at least to an electrical machine and/or for taking electricity via the multifunction converter from at least one of said electrical machines as a function of operating stages determined from said avionics system and from said control system.

The supervisor and the controller are of known type and they are used in a particular way. Thus, the supervisor controls torque/speed regulation of the electrical members. The supervisor determines the electrical characteristics to be delivered as a function of the control signal that is received. The controller informs the supervisor about the configuration of the electricity network and the functions to be carried out. In a variant, the functions to be carried out are determined by the supervisor of the multifunction converter and not by the controller.

It should be recalled that the term "high voltage" is used for equipment conveying electricity at high voltage, e.g. of the order of not less than 60 V. The high-voltage electricity network may for example be a network fed with 115 Vac or 200 Vac at 400 Hz or with 270 Vdc or with 330 Vdc, with the configuration and its protection being managed by the high-voltage electrical master boxes.

Conversely, the term "low voltage" is used for equipment conveying electricity at low voltage, e.g. of the order of 28 V.

The multifunction converter is thus connected to a high-voltage electrical master box, the high-voltage electrical master box itself being connected to a plurality of electrical members. The electrical members may be an electrical machine, an electric motor, or indeed an electricity generator.

Under such circumstances, this architecture makes it possible to use a single multifunction converter per fuel burning engine that communicates electrically with a plurality of electrical members.

Depending on its variants, this architecture makes it possible to supply electricity via a single multifunction converter suitably incorporated in the electricity network of the aircraft:

on the ground, to an accessory gearbox;
to the main electrical machine in order to start an fuel burning engine from a variety of electricity sources;
to the main electrical machine in order to assist the fuel burning engine in the context of hybrid propulsion;
to a low-voltage electricity network; and
to a high-voltage electricity network.

This simplification tends to optimize the weight of the electrical architecture of the aircraft.

In addition, this architecture makes it possible to drive an accessory gearbox of the transmission assembly by using the secondary electrical machine.

Thus, the secondary electrical machine makes it possible on the ground to operate hydraulic and pneumatic accessories by taking electricity. This architecture thus makes it possible to avoid partial electrification of certain accessories.

The architecture may also include one or more of the following characteristics.

Thus, the high-voltage direct current bus may be connected directly to the first line. Under such circumstances, the electricity source may generate a high voltage, e.g. at 270 Vdc.

Nevertheless, the electricity source may also generate a three-phase high-voltage system, with a phase voltage of 115 Vac or of 230 Vac, for example.

Under such circumstances, the high-voltage direct current bus communicates electrically with the first line by being connected to a converter for converting between high-voltage alternating current and high-voltage direct current, this converter for converting between high-voltage alternating current and high-voltage direct current being connected to the first line.

The converter for converting between high-voltage alternating current and high-voltage direct current then represents a rectifier stage at the input to the multifunction converter.

Furthermore, the electricity source may include high-voltage ground connectors for feeding electricity to a high-voltage electrical master box.

A high-voltage ground connector can enable the electrical architecture to be connected to high-voltage electrical power supply means.

In addition, the architecture may include at least one electric motor electrically powered by the second line via the high-voltage electrical master box.

The electric motor may be the motor of a compressor or an air conditioning system or of a hydraulic pump, for example.

The motor may be used when the multifunction converter is not being loaded in some other way. In particular, the electric motor may serve on the ground to power the air conditioning function, and then it may be used for starting a fuel burning engine, and then once more for powering the air conditioning once starting is over.

In an embodiment, the architecture has two fuel burning engines, each fuel burning engine being connected to a multifunction converter by a respective high-voltage electrical master box, the high-voltage electrical master boxes being connected together, at least one high-voltage electrical master box being connected to a ground connector.

Consequently, each engine forms part of a high-voltage subassembly including a high-voltage electrical master box and a multifunction converter.

At least one of the high-voltage electrical master boxes is then connected to a high-voltage ground connector.

Furthermore, the architecture may include at least one piece of electrical equipment operating with high-voltage alternating current and connected to a high-voltage electrical master box.

In addition, the architecture may include a low-voltage electricity network connected to each high-voltage electrical master box by a converter for converting between high-voltage alternating current and low-voltage direct current, the electricity source powering the high-voltage electricity network including at least one battery connected to said converter for converting between high-voltage alternating current and low-voltage direct current via a low-voltage electrical master box.

The aircraft then has a low-voltage electricity network, e.g. at 28 Vdc, managed by low-voltage electrical master boxes having one or more batteries connected thereto.

In an alternative variant, the high-voltage electricity network does not have any battery.

While the main electrical machine is in use for assisting the engine in flight, certain architectures tend to give rise to electrical disconnections in the low-voltage electricity network.

The multifunction converter makes it possible nevertheless to power in parallel the main electrical machine and the low-voltage electricity network, i.e. using electrical energy generated by the secondary electrical machine.

Thus, the architecture may include a low-voltage electricity network connected to each high-voltage electrical master box by a converter for converting between high-voltage alternating current and low-voltage direct current, said electricity source including at least one low-voltage ground connector connected to a low-voltage electrical master box of said low-voltage electricity network.

Furthermore, the multifunction converter may include a converter for converting between high-voltage direct current and low-voltage direct current, which is connected to a low-voltage electricity network and to said high-voltage direct current bus.

Consequently, the multifunction converter may have three electricity conversion means suitable for operating jointly, namely a bidirectional inverter, a converter for converting between high-voltage alternating current and high-voltage direct current, and the converter for converting between high-voltage direct current and low-voltage direct current.

In addition to an electrical architecture, the invention provides an aircraft including a power transmission assembly connected to at least one lift rotor and driven by at least one fuel burning engine. The aircraft includes such an electrical architecture. The lift rotor may also contribute at least to some extent to propelling the aircraft.

Furthermore, the transmission assembly possibly includes a power transmission gearbox driven by each engine, and the secondary electrical machine may be connected to the power transmission gearbox.

The secondary electrical machine can then participate in driving the power transmission gearbox in order to contribute to driving the lift rotor. The mechanical energy needed may come from a source that is dedicated to operating the secondary electrical machine during such a stage of operation.

Furthermore, the secondary electrical machine can generate electricity by being driven by the power transmission gearbox.

Furthermore, the transmission assembly possibly includes a power transmission gearbox driven by each fuel burning engine, the power transmission gearbox driving an accessory gearbox, and the secondary electrical machine is connected to the accessory gearbox.

The secondary electrical machine can then enable accessories to operate by driving the accessory gearbox.

Furthermore, the second electrical machine can generate electricity by being driven by the accessory gearbox.

In addition, the transmission assembly comprises a power transmission gearbox driven by each fuel burning engine, said power transmission gearbox driving an accessory gearbox, and said architecture including an auxiliary engine driving said accessory gearbox.

The auxiliary power unit can be an auxiliary power unit.

The auxiliary engine supplies mechanical power to the accessory gearbox, and possibly also to the power transmission gearbox.

The auxiliary engine can drive the secondary electrical machine via the accessory gearbox, with the secondary electrical machine then generating electricity so as to constitute a source of high-voltage electricity.

Furthermore, the invention provides a method of using the aircraft. The method comprises the following steps:

during a step of starting said fuel burning engine performed during a stage of operation on the ground, taking electricity from said electricity source and conveying the electricity in said high-voltage electricity network to said multifunction converter, to a second line, and then to said high-voltage electrical master box, said main electrical machine operating in motor mode in order to start said fuel burning engine;

during a step of starting to generate electricity, generating electricity with said main electrical machine operating in electricity generator mode, and transferring said electricity to said multifunction converter successively via a high-voltage electrical master box and a second line, e.g. in order to power equipment of the aircraft or in order to start another engine; and in flight and during a stage of hybrid operation, taking electricity from said electricity source and conveying the electricity in said high-voltage electricity network to said multifunction converter, to a second line, and then to said high-voltage electrical master box, said main electrical machine operating in motor mode.

The starting step is referred to for convenience below as the "second" step. The method makes it possible to perform a first step on the ground that does not involve the engine.

Thus, the supervisor uses the control system of the engine to determine whether the engine has stopped completely, for example. If a signal to start is issued, the supervisor communicates with the controller so that the electrical energy that is taken is directed to the main electrical machine in order to cause it to operate in motor mode. The supervisor then puts into operation the inverter so as to drive the main electrical machine in the required manner. In addition, the controller controls switches of the high-voltage electrical master box in order to power the main electrical machine.

Beyond a certain stage, the engine starts. If necessary, the supervisor then begins a step of generating electricity referred to as a "third" step.

For example, the supervisor determines that the engine has a gas generator that has reached a threshold speed of rotation. The supervisor deduces therefrom that the engine has started.

Hereafter, the supervisor communicates with the controller in order to receive electricity, if necessary, from the main electrical machine operating in electricity generator mode.

This electricity may be transmitted for example to a low-voltage electricity network and/or to equipment of the high-voltage electricity network.

Furthermore, the engine may be assisted by the main electrical machine in flight during a hybrid stage.

The manufacturer then determines the avionics parameters that need to be compared with thresholds.

The supervisor thus makes a comparison in order, where appropriate, to begin a hybrid stage known as the "fourth" step.

During this fourth step, the supervisor communicates with the controller so that the electricity that is taken is sent to the main electrical machine in order to make it operate in motor mode.

The method may also include one or more of the following characteristics.

During a stage of operation on the ground referred to as a "first" step, electricity is taken from said electricity source and the electricity is conveyed in said high-voltage electricity network to the secondary electrical machine successively via at least one high-voltage electrical master box, a first line, a multifunction converter, a second line, and then said high-voltage electrical master box, the secondary electrical machine operating in motor mode in order to provide said transmission assembly with at least some of its drive.

More particularly, the secondary electrical machine may enable equipment to be operated on the ground, and in particular equipment connected to the accessory gearbox.

In addition, during a stage of operating on the ground, electricity may be taken from said electricity source and then the electricity is conveyed to a low-voltage electricity network successively via at least one high-voltage electrical master box, a first line, and said multifunction converter.

Whatever the operating step, it is possible to take electricity from said electricity source by taking electricity from a high-voltage ground connector feeding at least a high-voltage electrical master box.

In a variant, it is possible to take electricity from said electricity source by:

driving an accessory gearbox of said power transmission assembly via an auxiliary engine; and generating electricity from a secondary electrical machine engaged with said accessory gearbox in order to cause said secondary electrical machine to operate in electricity generator mode, said secondary electrical machine representing said electricity source feeding electricity at least to a high-voltage electrical master box.

In a variant, the electricity is taken from said electricity source by taking electricity from a low-voltage electricity source of a low-voltage electricity network and by transferring this electricity to said multifunction converter.

For example, starting an electric motor may require a large amount of electrical power.

Under such circumstances, the second step is advantageously performed while using an electricity source of the high-voltage electricity network, namely a high-voltage ground connector or the secondary electrical machine.

Nevertheless, electricity may be taken from the low-voltage electricity network and converted by the multifunction converter.

This electricity can also be taken from the low-voltage electricity network, converted by a converter of the low-voltage electricity network, and then transmitted to the multifunction converter by a high-voltage electrical master box.

Electricity may be conveyed to a multifunction converter via at least one high-voltage electrical master box and then via a first line.

In this mode, the electrical power supplied to the main electrical machine is optionally less than the electrical power required, thus leading to lower performance starting of the fuel burning engine. This operating configuration can also be used for delivering electrical power to a gas generator of a fuel burning engine by taking energy from the battery during a hybrid stage of operation.

Furthermore, it is possible to power at least one piece of electrical equipment operating with high-voltage alternating current via a multifunction converter.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

Figure 1:
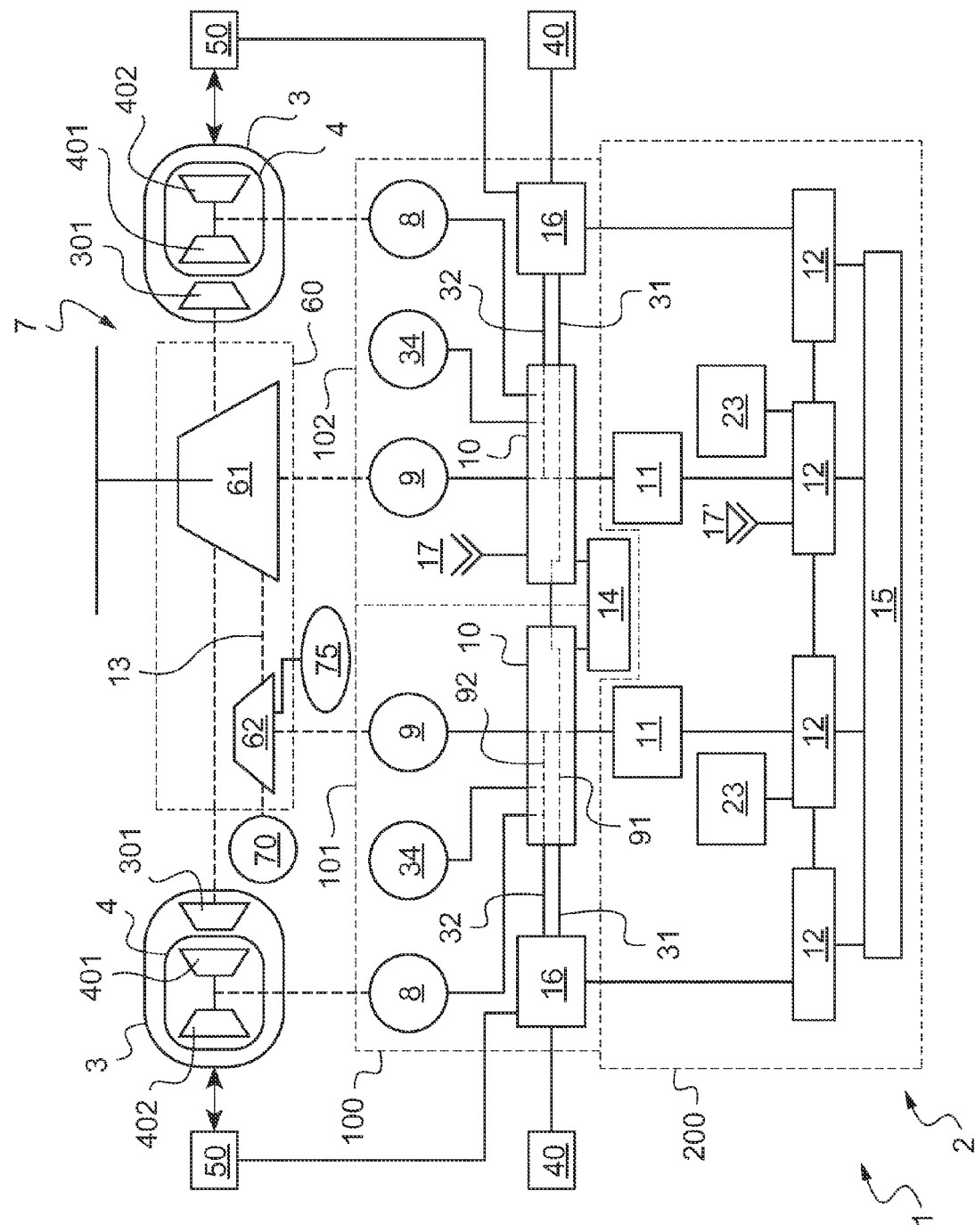
FIG. 1 is a diagrammatic view of an aircraft of the invention.

FIG. 1 shows an aircraft 1. By way of example, this aircraft is a rotorcraft having at least one lift rotor 7. Under such circumstances, the lift rotor 7 contributes to providing the aircraft 1 with at least some of its lift, and possibly also contributes to its propulsion.

The aircraft has a power plant in particular for driving the lift rotor in rotation.

The power plant has at least one fuel burning engine 3 driving a power transmission assembly 60.

Such a fuel burning engine 3 may be a turboshaft engine having a gas generator 4. The gas generator 4 is then conventionally provided with at least one compression stage 402 connected to a high pressure turbine 401. The turboshaft engine may also have at least one free turbine stage 301 that is secured to an outlet shaft, which is generally connected indirectly to the power transmission assembly 60. For example, each outlet shaft may be connected to the power transmission assembly 60 via a drive train including a "freewheel", a connecting shaft, and members for accommodating angular and/or axial misalignment between mechanical parts.

FIG. 1 shows two fuel burning engines of the turboshaft type.

Consequently, the power transmission assembly 60 has a power transmission gearbox 61 driven by the fuel burning engines 3. The gearbox 61 has a rotor mast for driving the lift rotor 7 in rotation.

Furthermore, the power transmission assembly 60 may include an accessory gearbox 62 that is mechanically connected to the power transmission gearbox 61 via at least one intermediate shaft 13.

The accessory gearbox serves to operate accessories 75. Thus, the accessory gearbox is connected to the accessories 75.

In addition, the aircraft may have an auxiliary engine 70 for driving the accessory gearbox 62. Such auxiliary engine can be an engine known with the acronym APU for "Auxiliary Power Unit".

Furthermore, the aircraft has one control system 50 per engine. The control system 50 may serve to receive data relating to the operation of the fuel burning engine and/or to controlling the operation of the fuel burning engine, e.g. by controlling a fuel metering valve.

Such a control system may be a system known as a full authority digital engine control (FADEC) or a system known as an engine control unit (ECU).

Reference may be made to the literature in order to obtain descriptions of an aircraft power plant.

Furthermore, the aircraft 1 has an electrical architecture 2 co-operating with the power plant.

The electrical architecture 2 comprises a high-voltage electricity network 100 mechanically connected to the power plant, and possibly also a low-voltage electricity network 200 electrically connected to the high-voltage electricity network 100.

The high-voltage electricity network 100 has one high-voltage subassembly 101, 102 per fuel burning engine 3. On a multi-engined aircraft, the high-voltage subassemblies 101, 102 may optionally be electrically interconnected.

FIG. 1 shows a twin-engined aircraft having two subassemblies. Nevertheless, FIG. 1 shows one particular variant of the invention, and the aircraft could have a single fuel burning engine and therefore only one subassembly, or it could have at least three fuel burning engines, and thus at least three subassemblies, for example.

In other words, the invention provides an aircraft having at least one fuel burning engine associated with an electrical architecture that includes at least one subassembly.

Each high-voltage subassembly 101, 102 comprises a main electrical machine 8 that is mechanically connected to a fuel burning engine 3. A main electrical machine 8 operates:

either in an electric motor mode in which the main electrical machine 8 draws electricity (electrical energy) in order to drive the gas generator 4;

or else in an electricity generator mode in which the main electrical machine 8 is driven by the gas generator 4 in order to generate electricity (electrical energy).

Furthermore, each high-voltage subassembly 101, 102 may include a secondary electrical machine 9 that is mechanically connected to the power transmission assembly 60.

Under such circumstances, the secondary electrical machine 9 may be mechanically connected to the power transmission gearbox 61 or to an accessory gearbox 62.

For example, a first high-voltage subassembly 101 includes a secondary electrical machine 9 connected to the accessory gearbox 62, while a second high-voltage subassembly 102 includes a secondary electrical machine 9 connected to the power transmission gearbox 61.

Each secondary electrical machine 9 operates:

either in an electric motor mode in which the secondary electrical machine 9 draws electricity in order to provide the power transmission assembly 60 with at least some of its drive;

or else in an electricity generator mode in which the secondary electrical machine 9 is driven by the power transmission assembly 60 in order to generate electricity.

Furthermore, at least one high-voltage subassembly 101, 102 may include an electrical member of the electric motor type. This electrical member is referred to more simply as an "electric motor" 34.

Under such circumstances, each high-voltage subassembly has a single high-voltage electrical master box 10 and a single multifunction converter 16 for electrically powering the electrical machines of the subassembly and/or for drawing electrical energy from those electrical machines.

Two distinct high-voltage subassemblies may be electrically connected together.

In one variant, each of the two distinct high-voltage subassemblies comprises a respective high-voltage electrical master box 10, with the two high-voltage electrical master boxes 10 being connected together, e.g. via switches.

In an alternative variant, two distinct high-voltage subassemblies include a single high-voltage electrical master box in common.

Consequently, the aircraft may have one multifunction converter 16 and one main electric motor 8 per fuel burning engine. The term "high-voltage subassembly" is thus used for a portion of the high-voltage electricity network that comprises a high-voltage electrical master box, a multifunction converter, and a main electric motor.

Consequently, a high-voltage electrical master box 10 is connected to a multifunction converter 16 via a first electricity line referred to as a "first line" 31.

Furthermore, the multifunction converter 16 may be connected directly to the main electrical machine 8.

Nevertheless, this multifunction converter 16 may be connected indirectly to the main electrical machine 8 via the electrical master box.

Under such circumstances, the multifunction converter 16 shown in FIG. 1 is connected to the high-voltage electrical master box 10 via said first line 31, and also via a second electricity line referred to as a "second line" 32.

Under such circumstances, the high-voltage electrical master box 10 is electrically connected to at least one electricity source. Thus, the high-voltage electrical master box 10 has a first electrical connection 91 connected to the first line 31 in order to convey electricity coming from an electricity source to the multifunction converter.

Two high-voltage electrical master boxes 10 of two subassemblies may also be electrically connected together via their first connections.

The electricity source may be a high-voltage ground connector 17, a low-voltage ground connector 17', a battery 23, and a secondary electrical machine 9.

Thus, a high-voltage ground connector 17 connected to the first connection of a high-voltage electrical master box 10 can deliver electricity to the first connection of another high-voltage electrical master box 10 in the variant shown in FIG. 1.

In addition, the electrical architecture may include a low-voltage electricity network 200 having at least one electricity source suitable for electrically powering or being electrically powered by the multifunction converter.

The low-voltage electricity network 200 includes a plurality of pieces of low-voltage equipment 15 that operate by using low-voltage electricity.

Under such circumstances, the low-voltage electricity network 200 has a plurality of low-voltage electrical master boxes 12 connected to the low-voltage equipment and interconnected in pairs. The low-voltage electricity network 200 has at least one low-voltage electrical master box 12, where such a low-voltage electrical master box 12 is connected to a high-voltage electrical master box via a converter 11 for converting between high-voltage alternating current and low-voltage direct current.

Consequently, the electricity source may have at least one battery 23 electrically connected to a low-voltage electrical master box 12.

The electricity source may also have a low-voltage ground connector 17' electrically connected to a low-voltage electrical master box 12.

In addition to a first connection 91, the high-voltage electrical master box 10 has a second electrical connection 92 connected to the second line 32 and to each electrical member. The second connection 92 is thus connected to the main electrical machine 8 and to the secondary electrical machine 9, and where appropriate to an electric motor 34.

Furthermore, the second connection 92 of a high-voltage electrical master box 10 may serve to power electrically a piece of electrical equipment 14 that operates with high-voltage alternating current. Such a piece of equipment is referred to for convenience as "high-voltage equipment".

Furthermore, each converter is connected via a wired or wireless connection with the control system 50 of the corresponding fuel burning engine. In addition, the multifunction converter is connected to an avionics system 40 of the aircraft.

The avionics system is capable of acquiring data representing the operating states of the multifunction converter, such as its state/status, operational parameters, and defaults. The avionics system may include data storage means and possibly a display system for displaying information to a crew member.

The avionics system has the usual sensors for acquiring environmental data such as the outside temperature and the altitude of the aircraft.

The data coming from the avionics system may be forwarded to the control system 50 by the multifunction converter 16. For example, the control system 50 then adapts the power demand needed for starting a fuel burning engine and then informs the multifunction converter 16 of the demanded level of torque, of speed, or of acceleration.

Alternatively, the torque, speed, or acceleration levels are stored in the multifunction converter, with the multifunction converter selecting the appropriate levels as a function of environmental context data supplied by the avionics system and/or the control system 50.

A controller then determines the available energy sources and possibly selects an energy source in order to match it to the power demand requested by the control system.

Under such circumstances, the multifunction converter of a high-voltage subassembly communicates with the high-voltage electrical master box of that high-voltage subassembly so that it powers electrically at least one electrical machine 8, 34, 9, and at least one piece of electrical equipment 14 and/or so that it takes electricity from at least one of said electrical machines 8, 9 depending on the current stage of operation. The multifunction converter uses data coming from the avionics system 40 and the control system 50 in order to determine the nature of the current operating stage, and it controls the electrical machines accordingly.

Figure 2:
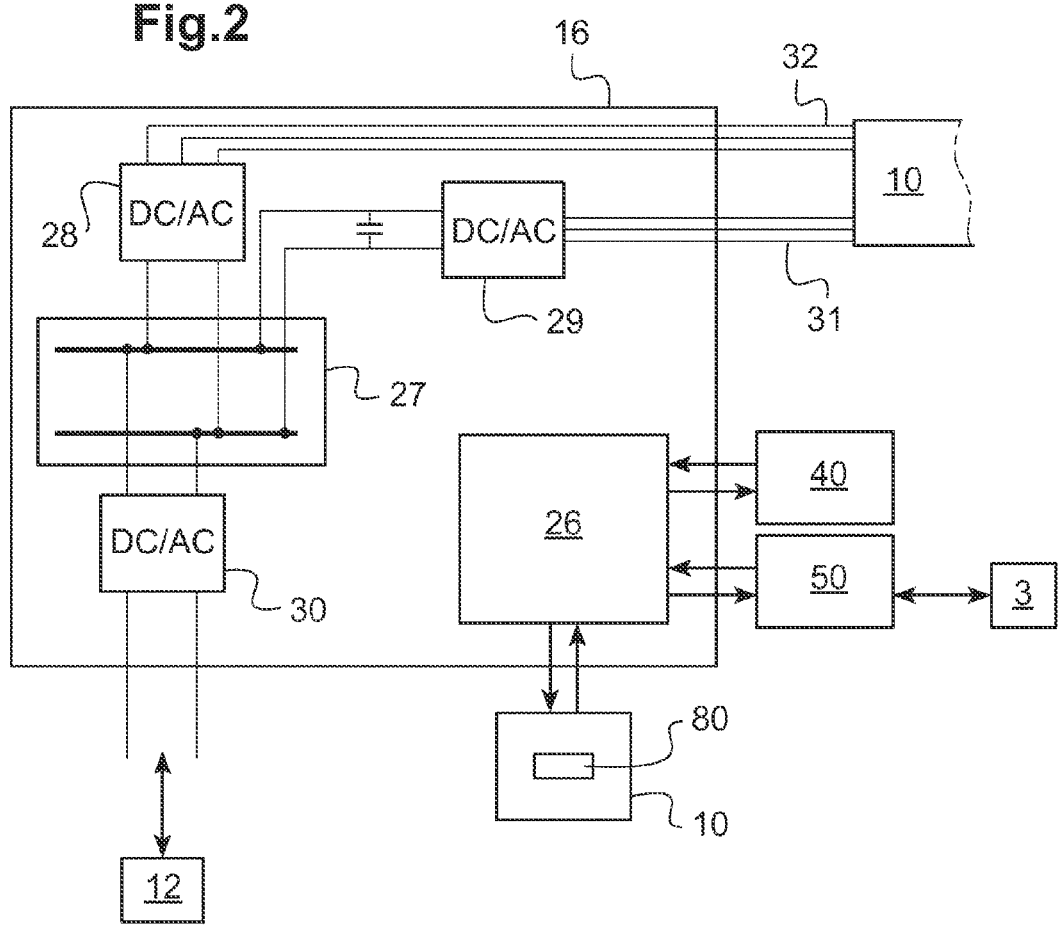
FIG. 2 is a diagrammatic view of a multifunction converter.

Consequently, and with reference to FIG. 2, a multifunction converter has a high-voltage direct current bus 27.

This high-voltage direct current bus 27 is connected to the second line 32 via a bidirectional inverter 28.

Furthermore, the high-voltage direct current bus 27 is electrically connected to the first line 31 either directly or indirectly.

In the variant of FIG. 2, the high-voltage direct current bus 27 is electrically connected to the first line 31 indirectly via a converter 29 for converting between high-voltage alternating current and high-voltage direct current. Nevertheless, the converter 29 for converting between high-voltage alternating current and high-voltage direct current could optionally be omitted, depending on the nature of the electricity supplied via a high-voltage ground connector, for example.

In addition, the high-voltage direct current bus 27 is electrically connected to the low-voltage electricity network via a converter 30 for converting between high-voltage direct current and low-voltage direct current.

The bidirectional inverter 28, the converter 30 for converting between high-voltage direct current and low-voltage direct current, the converter 29 for converting between high-voltage alternating current and high-voltage direct current, and the high-voltage direct current bus 27 are then controlled by a supervisor 26 of the multifunction converter.

Figure 3:
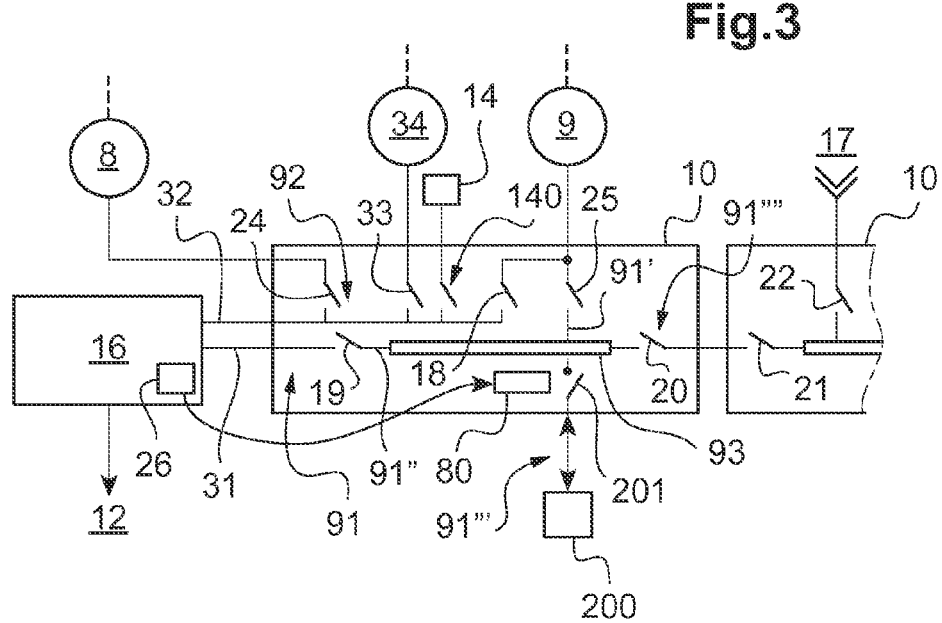
FIG. 3 is a diagrammatic view of a high-voltage electrical master box.

With reference to FIG. 3, the supervisor 26 also communicates with a controller 80 of the corresponding high-voltage electrical master box 10.

The high-voltage electrical master box 10 has multiple switches and an electricity bus controlled by the controller 80 on orders from the supervisor 26.

Thus, the first connection 91 comprises a bus 93. This bus 93 is then connected:

to the secondary electrical machine 9 via a first segment 91' of the first connection 91 including a first primary switch 25;

to the first line 31 via a second segment 91" of the first connection 91 including a second primary switch 19;

to a low-voltage electricity network 200 via a third segment 91''' of the first connection 91 including a third primary switch 201;

to another high-voltage electrical master box via a fourth segment 91"" of the first connection 91 including a fourth primary switch 20, 21; and to a ground connector via a fifth segment of the first connection 91 including a fifth primary switch 22.

In addition, the second connection is connected:
to the main electrical machine 8 via a first segment including a first secondary switch 24;

to the electric motor 34 via a second segment including a second secondary switch 33;

to the secondary electrical machine 9 via a third segment including a third secondary switch 18; and to a piece of electrical equipment 14 via a fourth segment including a fourth secondary switch 140.

Such an electrical architecture can operate in various modes as a function of the current stage of operation.

In a first step STP1, corresponding to a stage of operation on the ground, all of the engines 3 are off.

Nevertheless, certain hydraulic, electrical, or pneumatic accessories of the aircraft may possibly be used.

In particular, accessories 75 connected to the accessory gearbox 62 may be required to operate.

Under such circumstances, electrical energy is taken from an electricity source and conveyed via the high-voltage electricity network 100 to a secondary electrical machine 9, passing via the multifunction converter 16. This secondary electrical machine 9 operates in electric motor mode to drive the accessory gearbox 62.

For example, the supervisor of the multifunction converter 16 detects via the avionics system that the aircraft is on the ground, e.g. on the basis of information about the force exerted on landing gear. Furthermore, the supervisor acts via the control systems of the engines to detect that they are off.

The supervisor can also detect that the operation of an accessory is required. For example, operating a control button of an accessory sends a signal to the supervisor via the avionics system.

Under such circumstances, the supervisor orders the controller of the high-voltage electrical master box to close the third secondary switch 18. In addition, the controller orders the first primary switch 25, the first secondary switch 24, and the second secondary switch 33 to be opened.

In an alternative, the controller receives an order to operate an accessory. The controller then closes the appropriate contactors, and informs the supervisor which accessory is to operate.

The controller and the supervisor can also receive the order to operate an accessory at the same time.

Independently of the variant, if electricity is taken from a high-voltage ground connector 17 connected to the high-voltage electrical master box concerned, the fifth primary switch 22 and the second primary switch 19 are closed.

If the electricity is taken from a high-voltage ground connector 17 connected to a high-voltage electrical master box that is distinct from the high-voltage electrical master box being controlled, then the second primary switch 19, the fifth primary switch 22, and the fourth primary switches 20, 21 are closed.

The supervisor can determine that a high-voltage ground connector 17 is in use by means of the avionics system.

The controller 80 may also determine that a high-voltage ground connector is in use, and can send that information to the avionics system which in turn authorizes or does not authorize activation of one or another function of the multifunction converter.

The supervisor then puts into operation the high-voltage direct current bus 27, the bidirectional inverter 28, and where appropriate the converter 29 for converting between high-voltage alternating current and high-voltage direct current in order to supply the required electricity to the secondary electrical machine 9.

If the electrical energy is taken from the low-voltage electricity network 200 coming from a battery of a low-voltage ground connector, then the electricity is transmitted to the multifunction converter directly by a low-voltage electrical master box 12, or indirectly via the converter 11 for converting between high-voltage alternating current and low-voltage direct current and a high-voltage electrical master box 10.

The supervisor can determine that the low-voltage electricity network 200 is in use via the avionics system or via a low-voltage electrical master box 12.

The supervisor then puts into operation the high-voltage direct current bus 27, the bidirectional inverter 28, and the converter 30 for converting between high-voltage direct current and low-voltage direct current in order to supply the required electricity to the secondary electrical machine 9.

In the first step, electricity may be taken and conveyed to the low-voltage electricity network 200 successively via at least one high-voltage electrical master box 10, a first line 31, and said multifunction converter 16. This energy can then be used for recharging the battery 23 and/or for operating equipment that operates at low voltage, in addition to or independently of the converter 11 for converting between high-voltage alternating current and low-voltage direct current.

If electricity is taken from a high-voltage ground connector 17 connected to the high-voltage electrical master box in question, the fifth primary switch 22 and the second primary switch 19 are closed.

If electricity is taken from a high-voltage ground connector 17 connected to a high-voltage electrical master box distinct from the high-voltage electrical master box being controlled, then the second primary switch 19, the fifth primary switch 22, and the fourth primary switches 20 and 21 are closed.

The supervisor then puts into operation the high-voltage direct current bus 27, the converter 30 for converting between high-voltage direct current and low-voltage direct current, and where appropriate the converter 29 for converting between high-voltage alternating current and high-voltage direct current in order to supply the required electricity to the low-voltage electricity network 200.

During a second step STP2 corresponding to a step of starting a fuel burning engine 3 as performed during a stage of operating on the ground, electricity is taken from an electricity source and then conveyed via the high-voltage electricity network 100 to a main electrical machine 8 via the multifunction converter 16, a second line 32, and then the high-voltage electrical master box 10. The main electrical machine 8 then operates in motor mode in order to start said engine.

In a first variant, the energy is taken from a high-voltage ground connector.

If the electricity is taken from a high-voltage ground connector 17 connected to the high-voltage electrical master box in question, the fifth primary switch 22 and the second primary switch 19 and the first secondary switch 24 are closed. The second secondary switch 33, the fourth secondary switch 140, and the first primary switch 25 are open.

If the electricity is taken from a high-voltage ground connector 17 connected to a high-voltage electrical master box distinct from the high-voltage electrical master box being controlled, then the second primary switch 19, the fifth primary switch 22, the fourth primary switches 20, 21, and the first secondary switch 24 are closed. The second secondary switch 33, the fourth secondary switch 140, and the first primary switch 25 are open.

During these stages, the third primary switch 201 is preferably closed. More generally, the third primary switch 201 is closed as soon as the high-voltage electricity network is powered either by the high-voltage ground connector 17 or by the secondary electrical machine 9.

The supervisor then puts into operation the high-voltage direct current bus 27, the bidirectional inverter 28, and where appropriate the converter 29 for converting between high-voltage alternating current and high-voltage direct current in order to supply the required electricity to the main electrical machine 8.

In a second variant, the electricity is generated by the secondary electrical machine. Under such circumstances, the auxiliary engine 70 is used to produce electricity with the help of the secondary electrical machine. The auxiliary engine should previously have been started, e.g. using a battery or a 28 Vdc ground connector via a 28 Vdc starter.

The first primary switch 25, the second primary switch 19, the first secondary switch 24, and the fourth primary switches 20, 21 are closed. The second secondary switch 33 and the fourth secondary switch 140 are open.

The supervisor then puts into operation the high-voltage direct current bus 27, the bidirectional inverter 28, and where appropriate the converter 29 for converting between high-voltage alternating current and high-voltage direct current in order to supply the required electricity to the main electrical machine 8.

In a degraded third variant, electricity is taken from a low-voltage ground connector or from a battery.

Under such circumstances, the third primary switch 201, the second primary switch 19, and the first secondary switch 24 are closed.

The supervisor then puts into operation the high-voltage direct current bus 27, the bidirectional inverter 28, and where appropriate the converter 29 for converting between high-voltage alternating current and high-voltage direct current in order to supply the required electricity to the main electrical machine 8.

The multifunction converter may also be powered directly by the low-voltage electricity network 200.

The second step may stop when the supervisor detects that the fuel burning engine has started. For example, for this purpose, the supervisor monitors changes in the speed of rotation of a gas generator of the fuel burning engine, possibly via the control system 50.

In a third step STP3 corresponding to a step of generating electricity, the supervisor may require electricity to be generated.

For example, the supervisor may detect a weakening in the capacity of a battery or it may be detect the need to supply electricity either to low-voltage equipment 15 or to high-voltage equipment 14.

Under such circumstances, the main electrical machine 8 can operate in electricity generator mode in order to generate electricity. This electricity is then transmitted to the multifunction converter 16 successively via a high-voltage electrical master box 10 and a second line 32.

Under such circumstances, the first secondary switch 24, and possibly also the second primary switch 19 and the third primary switch 201 are closed. The other switches are open.

The supervisor then puts into operation the high-voltage direct current bus 27, the bidirectional inverter 28, and where appropriate the converter 29 for converting between high-voltage alternating current and high-voltage direct current or the converter 30 for converting between high-voltage direct current and low-voltage direct current.

Electricity is then transmitted to the low-voltage electricity network by the converter 30 for converting between high-voltage direct current and low-voltage direct current, or to a high-voltage electrical master box via the first line 31.

Likewise, the secondary electrical machine 9 can operate in electricity generator mode in order to generate electricity. This electricity is then transmitted to the multifunction converter 16 successively via a high-voltage electrical master box 10 and a second line 32.

Under such circumstances, the third secondary switch 18 and possibly the second primary switch 19 are closed. The other switches are open.

The supervisor then puts into operation the high-voltage direct current bus 27, the bidirectional inverter 28, and where appropriate the converter 29 for converting between high-voltage alternating current and high-voltage direct current and/or the converter 30 for converting between high-voltage direct current and low-voltage direct current.

Electricity is then transmitted to the low-voltage electricity network by the converter 30 for converting between high-voltage direct current and low-voltage direct current, or to a high-voltage electrical master box via the first line 31.

In a fourth step STP4 that corresponds in flight to a stage of hybrid operation, electricity is taken from said electricity source and then the electricity is conveyed via said high-voltage electricity network 100 to said multifunction converter 16, a second line 32, and said high-voltage electrical master box 10, said main electrical machine 8 operating in motor mode.

This energy may come from the secondary electrical machine operating in generator mode. Under such circumstances, the first primary switch 25, the second primary switch 19, the first secondary switch 24, and the third primary switch 201 are closed. The other switches are open.

The supervisor then puts into operation the high-voltage direct current bus 27, the bidirectional inverter 28, and where appropriate the converter 29 for converting between high-voltage alternating current and high-voltage direct current.

This energy may come from the low-voltage electricity network 200. Under such circumstances, the first secondary switch 24 and the third primary switch 201 are closed. The other switches are open.

The supervisor then puts into operation the high-voltage direct current bus 27, the bidirectional inverter 28, and the converter 30 for converting between high-voltage direct current and low-voltage direct current.

Furthermore, the architecture also makes it possible to take electricity from the low-voltage electricity network in order to operate high-voltage equipment 14.

Under such circumstances, the first primary switch 201, the second primary switch 19, and the fourth secondary switch 140 are closed. The other switches are open.

The supervisor then puts into operation the high-voltage direct current bus 27, the bidirectional inverter 28, and the converter 30 for converting between high-voltage direct current and low-voltage direct current.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An electrical architecture for an aircraft including a power transmission assembly connected to at least one lift rotor and driven by at least one fuel burning engine, the electrical architecture comprising a high-voltage electricity network including a main electrical machine for connecting to the fuel burning engine and a secondary electrical machine for connecting to the power transmission assembly, wherein the high-voltage electricity network comprises at least one high-voltage electrical master box connected to at least one source of electricity, the high-voltage electrical master box being connected by a first line and by a second line to a multifunction converter, the high-voltage electrical master box having a first connection connecting the first line to the secondary electrical machine, the high-voltage electrical master box having a second connection connecting the second line to at least the main electrical machine and to at least the secondary electrical machine, the multifunction converter including a high-voltage direct current bus connected to a bidirectional inverter, the bidirectional inverter being connected to the second line, the high-voltage direct current bus communicating electrically with the first line, the multifunction converter having a supervisor connected to an avionics system and to a control system for controlling the fuel burning engine and to a controller of the high-voltage electrical master box in order to feed electricity at least to an electrical machine and/or to take electricity via the multifunction converter from at least one of the electrical machines as a function of operating stages determined from the avionics system and from the control system.

2. An electrical architecture according to claim 1, wherein the electricity source includes a high-voltage ground connector electrically powering a high-voltage electrical master box.

3. An electrical architecture according to claim 1, wherein the architecture includes at least one electric motor electrically powered by the second line via the high-voltage electrical master box.

4. An electrical architecture according to claim 1, wherein the architecture has two fuel burning engines, each fuel burning engine being connected to the multifunction converter by a respective high-voltage electrical master box, the high-voltage electrical master boxes being connected together, at least one high-voltage electrical master box being connected to a high-voltage ground connector.

5. An electrical architecture according to claim 1, wherein the architecture includes at least one piece of electrical equipment operating with high-voltage alternating current and connected to a high-voltage electrical master box.

6. An electrical architecture according to claim 1, wherein the architecture includes a low-voltage electricity network connected to each high-voltage electrical master box by a converter for converting between high-voltage alternating current and low-voltage direct current, the electricity source including at least one battery connected to the converter for converting between high-voltage alternating current and low-voltage direct current via a low-voltage electrical master box.

7. An electrical architecture according to claim 1, wherein the architecture includes a low-voltage electricity network connected to each high-voltage electrical master box by a converter for converting between high-voltage alternating current and low-voltage direct current, the electricity source including at least one low-voltage ground connector connected to a low-voltage electrical master box of the low-voltage electricity network.

8. An electrical architecture according to claim 1, wherein the multifunction converter includes a converter for converting between high-voltage direct current and low-voltage direct current, the converter being connected to a low-voltage electricity network and to the high-voltage direct current bus.

9. An electrical architecture according to claim 1, wherein the high-voltage direct current bus communicates electrically with the first line by being connected to a converter for converting between high-voltage alternating current and high-voltage direct current, this converter for converting between high-voltage alternating current and high-voltage direct current being connected to the first line.

10. An aircraft including a power transmission assembly connected to at least one lift rotor and driven by at least one fuel burning engine, wherein the aircraft includes an architecture according to claim 1.

11. An aircraft according to claim 10, wherein the transmission assembly comprises a power transmission gearbox driven by each fuel burning engine, and the secondary electrical machine is designed to be connected to the power transmission gearbox.

12. An aircraft according to claim 10, wherein the transmission assembly comprises a power transmission gearbox driven by each fuel burning engine, the power transmission gearbox driving an accessory gearbox, and the secondary electrical machine being designed to be connected to the accessory gearbox.

13. An aircraft according to claim 10, wherein the transmission assembly comprises a power transmission gearbox driven by each fuel burning engine, the power transmission gearbox driving an accessory gearbox, and the architecture including an auxiliary engine driving the accessory gearbox.

14. A method of using an aircraft according to claim 10, the method comprising the following steps:
during a step (STEP2) of starting the fuel burning engine performed during a stage of operation on the ground, taking electricity from the electricity source and conveying the electricity in the high-voltage electricity network to the multifunction converter, to a second line, and then to the high-voltage electrical master box, the main electrical machine operating in motor mode in order to start the fuel burning engine;
during a step (STEP3) of generating electricity, generating electricity with the main electrical machine operating in electricity generator mode, and transferring the electricity to the multifunction converter successively via a high-voltage electrical master box and a second line; and
in flight and during a stage (STEP4) of hybrid operation, taking electricity from the electricity source and conveying the electricity in the high-voltage electricity network to the multifunction converter, to a second line, and then to the high-voltage electrical master box, the main electrical machine operating in motor mode.

15. A method according to claim 14, wherein during a stage (STEP1) operating on the ground, electricity is taken from the electricity source and the electricity is conveyed in the high-voltage electricity network to the secondary electrical machine successively via at least one high-voltage electrical master box, a first line, a multifunction converter, a second line, and then the high-voltage electrical master box, the secondary electrical machine operating in motor mode in order to provide the transmission assembly with at least some of its drive.

16. A method according to claim 14, wherein during a stage (STEP1) of operating on the ground, electricity is taken from the electricity source and then the electricity is conveyed to a low-voltage electricity network successively via at least one high-voltage electrical master box, a first line, and the multifunction converter.

17. A method according to claim 14, wherein electricity is taken from the electricity source by taking electricity from a high-voltage ground connector feeding at least a high-voltage electrical master box.

18. A method according to claim 14, wherein electricity is taken from the electricity source by:
driving an accessory gearbox of the power transmission assembly via an auxiliary engine; and
generating electricity from a secondary electrical machine engaged with the accessory gearbox in order to cause the secondary electrical machine to operate in electricity generator mode, the secondary electrical machine representing the electricity source feeding electricity at least to a high-voltage electrical master box.

19. A method according to claim 14, wherein the electricity is taken from the electricity source by taking electricity from a low-voltage electricity source of a low-voltage electricity network and by transferring this electricity to the multifunction converter.

20. A method according to claim 19, wherein the electricity is conveyed to a multifunction converter via at least one high-voltage electrical master box and then via a first line.

21. A method according to claim 14, wherein at least one piece of electrical equipment operating with high-voltage alternating current is powered via a multifunction converter.

* * * * *